Patented Dec. 24, 1946

2,413,052

UNITED STATES PATENT OFFICE 2,413,052

METHOD FOR PREPARING ROSIN HYDROCARBONS

Nicholas L. Kalman, Rutherford, N. J., assignor to Ridbo Laboratories, Inc., Paterson, N. J., a corporation of New Jersey No Drawing. Application September 21, 1943, Serial No. 503,307

8 Claims. (Cl. 260—106)

This invention relates to a method for preparing rosin hydrocarbons from acidic rosin materials.

One of the primary objects of the invention is to provide an effective and efficient method for producing rosin hydrocarbons of high stability and low unsaturation.

More specifically, the process of the present invention makes possible high percentage yields of partially aromatized rosin hydrocarbons having a high degree of resistance to oxidation and embrittling whereby the improved products may be employed for many uses for which other types of rosin hydrocarbons are not as well suited. For instance, the resistance to oxidation and embrittling are both highly important characteristics rendering the improved products more suitable for use as plasticizers in many compositions, including plastics, film-forming and surface coating materials, natural and synthetic rubbers, and the like.

Briefly described, the process of the invention contemplates treatment of acidic rosin materials, such as gum and wood rosins with moderate amounts of sulfur, usually from 3 to 10%, with application of heat at an elevated temperature, for instance from about 170° C. to 200° C. This sulfur treatment is thereafter followed by treatment to decarboxylate the molecule.

By following this treatment procedure, I have found that the initial portion of the treatment, i. e., sulfurization, effects substantial decrease in unsaturation of the acidic rosin material, which characteristic is retained during the subsequent decarboxylation, thereby yielding a highly stable, non-oxidizing and non-embrittling rosin hydrocarbon.

In the sulfurization, sulfur may be employed in amounts up to about 20%. For extensive decrease in unsaturation and increase in stability, the quantity should preferably be upwards of about .5%, the maximum decrease in unsaturation usually being obtainable above about 2%, for instance at about 5–7%. Extensive increase of the percentage of sulfur above about 10% does not appear to further decrease the unsaturation or increase stability, so that the preferred range is from about 2 to about 10%.

The temperature of treatment will depend somewhat on the quantity of sulfur employed and on the particular rosin material being treated. I have found that sulfurization will take place at temperatures upwards of about 100° C., though the rate of reaction of sulfur at this lower limit is quite low. Where decarboxylation of the acidic material is to be avoided during the sulfurization step, the temperature should not be above 250° C., since above that point some appreciable decarboxylation will occur.

With respect to the temperature it is further pointed out that I have found it advantageous to employ a temperature above 140° C. for at least a part of the treatment, since I have found this promotes further decrease in unsaturation and increase in stability, as compared with that obtainable where the temperature is maintained below about 140° C. This is apparently due to the fact that above 140° C. sulfur which has been added to the molecule is released and combines with hydrogen atoms taken from the hydrophenanthrene nucleus, thereby evolving hydrogen sulfide and creating an additional double bond. The apparent effect is a partial aromatization of the molecule, i. e., a rearrangement of the three double bonds, yielding a product in which all three double bonds are located in one of the three rings of the molecule. In contrast, abietic acid, which is commonly considered to be the major constituent of most commercial rosin materials, has, according to recent postulations, two double bonds, each located in a different ring of the nucleus.

In view of the foregoing, it will be seen that the first stage of the treatment may involve not only sulfurization but also at least limited desulfurization (by evolution of hydrogen sulfide). If desired the sulfur may initially be added at a temperature below 140° C., and thereafter the temperature raised to a point above 140° C., in which event addition of sulfur and desulfurization will take place sequentially. On the other hand, sulfurization and desulfurization may take place more or less concurrently by adding the sulfur at a temperature above 140° C., for instance between about 160 and 220° C.

With either the sequential or concurrent sulfurization and desulfurization, the subsequent raising of the temperature above about 250° C. to effect decarboxylation will, of course, separate at least some sulfur and evolve hydrogen sulfide, whenever sulfur is still present.

After sulfurization and more or less desulfurization at temperatures below about 240° C., the temperature is then raised to an effective decarboxylation temperature, i. e., above 250° C., and most desirably above about 280° C. While application of heat alone will serve to decarboxylate the molecule, this action (with heat alone) is relatively slow, so that for decarboxylation, I prefer to employ decarboxylation promoting catalysts or agents, many of which are already known, for instance p-toluene sulfonic acid and p-toluene sulfochloride, as mentioned in Auer Patent 1,980,367 of November 13, 1934, or certain inorganic acids such for instance as phosphoric acid. With catalysts and appropriate decarboxylation temperature, for instance from about 250° C. to about 350° C., the decarboxylation will take place quite rapidly.

In connection with the higher temperatures which may be employed for decarboxylation, for instance temperatures close to 350° C., it may be mentioned that at about that point some cracking may occur, the exact point at which this action will set in depending on the treatment conditions and also on the nature of the material being treated.

For many purposes it is advantageous to avoid appreciable cracking or destructive distillation. Nevertheless, for certain purposes it is contemplated that partially cracked products are advantageously produced by operating under cracking conditions.

Distillation, either simple or fractional may also advantageously be employed for purposes such as purification and also for separation of constituents manifesting different degrees of unsaturation and other characteristics. All of the products secured in the various ways described above, (including by simple decarboxylation under noncracking conditions, cracking, and simple and fractional distillation) have in common various of the desirable characteristics contemplated by this invention, such as lowered unsaturation, increased stability and resistance to oxidation and embrittling.

Finally with respect to the treatment conditions, it is of importance that the conditions selected should be such as to avoid formation of appreciable quantities of retene, which is a completely aromatized material, in contrast to the partially aromatized nucleus which is characteristic of the products of the present invention. The percentage of sulfur employed and the temperatures utilized at various stages of the treatment should be in the ranges indicated above in order to avoid formation of appreciable quantities of retene.

Before considering the examples given below, it may be mentioned that the treatment is applicable to acidic rosin materials and rosin acids, in general, wherever such materials have at least some unsaturation in the hydrophenanthrene nucleus. For instance the process is applicable to the gum and wood rosins of commerce such as WW gum rosin, WW wood rosin, FF gum and wood rosins, as well as other grades, and also to more or less pure rosin acids, such as abietic acid, laevo-pimaric acid, and even to partially hydrogenated rosin acids such as dihydroabietic acid.

I believe that under appropriately selected treatment conditions within the preferred ranges indicated, when treating an acidic gum or wood rosin, at least a major constituent of the product secured is probably dehydroabietene.

EXAMPLES

WW wood rosin was treated with various percentages of sulfur under different treatment conditions in order to illustrate the effect of the treatment provided according to the present invention. The percentage of sulfur and treatment conditions for sulfurization and desulfurization are given below in Table I.

TABLE I
*Sulfurization-desulfurization*

| Example | Per cent sulfur | 1st stage of heating | | 2nd stage of heating | |
|---|---|---|---|---|---|
| | | Temp., °C. | Time, hrs. | Temp., °C. | Time, hrs. |
| 1 | 3.75 | 140 | 4 | (2) | (2) |
| 1a [1] | 3.75 | 140 | 4 | 220 | 2 |
| 2 | 7.5 | 165 | 4 | 230 | 2 |
| 3 | 10.6 | 165 | 4.25 | 255 | 5.5 |

[1] Portion of product of Example 1 was subjected to a second stage of heating as indicated.
[2] Omitted.

From the above it will be seen that the materials in most of the examples were subjected to two stages of heating, the second stage being at a higher temperature than the first stage. In Examples 1 and 1a the first stage of heating was at such a temperature (140° C.) that little if any evolution of hydrogen sulfide would occur. In Example 1a, therefore, which was also subjected to a second stage of heating at 220° C., evolution of hydrogen sulfide took place to an appreciable extent. This separation of combined sulfur tends to reduce the unsaturation, as compared with the single stage heating, as is shown by the iodine numbers given in Table III hereinafter.

With regard to Examples 2 and 3 in Table I above it may be mentioned that the temperature (165° C.) of the first stage of heating was sufficiently high to effect at least partial desulfurization concurrently with sulfurization. In these two examples additional sulfur was separated by evolution of hydrogen sulfide at the higher temperature employed in the second stage of heating.

In Table II just below the conditions for decarboxylation of the products of Table I are indicated.

TABLE II
*Decarboxylation*

| Example | Per cent decarbox. agent | Temp., °C. | Time, hrs. |
|---|---|---|---|
| 1 | 2% p-toluenesulfonic acid | 290 | 4 |
| 1a | do | 290 | 4 |
| 2 [1] | do | 300 | 4 |
| 2a [1] | 2% phosphoric acid (85%) | 290 | 4 |
| 3 | 1% p-toluenesulfonic acid | 275 | 5.25 |

[1] Portions of the sulfur-treated product of Example 2 decarboxylated with two different agents as indicated.

It may be noted that agents other than those indicated in Table II may be employed to promote decarboxylation and further that, if desired, at least partial decarboxylation may be effected without the addition of a catalyst, as by heating the material for an appreciable time at a relatively high temperature, for instance upwards of 300° C.

The acid and iodine values of the products at the several stages of treatment are given in Table III just below. Thus it will be seen that in the first portion of the table the acid and iodine numbers are given for the products of the sulfurization and desulfurization as per Table I. The corresponding values are also given for the products of the decarboxylation as per Table II. Finally Table III also includes acid and iodine numbers for the products of Table II (the decarboxylated products) after distillation thereof.

TABLE III

*Acid and Iodine (Hübl) numbers*

| Ex. | S-treated product | | Decarbox. product | | Distillate | |
|---|---|---|---|---|---|---|
| | Acid No. | I No. | Acid No. | I No. | Acid No. | I No. |
| 1 | 164 | 138 | 2.3 | 48 | 1.4 | 48 |
| 1a | 158 | 49 | 1.6 | 54 | 1.5 | 53 |
| 2 | 156 | 46 | 2.3 | 51 | 1.6 | 43 |
| 2a | 156 | 46 | 8.2 | 71 | 2.3 | 71 |
| 3 | (¹) | (¹) | 37 | 48 | 4.1 | 50 |

¹ Not taken.

| Untreated WW wood rosin | | Decarboxylated as Ex. 1 and distilled | |
|---|---|---|---|
| 162 | 128 | 3.9 | 139 |

At the bottom of the above table figures are also given for untreated WW wood rosin, as well as for WW wood rosin (not sulfurized) decarboxylated in the manner of Example 1, i. e., with 2% p-toluene-sulfonic acid. This decarboxylated wood rosin was also distilled and the figures for the distillate are given.

In considering the values shown in Table III, several points should be noted. In the first place, it will be seen that the acid number of the decarboxylated products and also of the decarboxylated and distilled products are all greatly reduced as compared not only with the untreated material but also with the sulfur-treated material. Moreover, the unsaturation, as evidenced by the iodine numbers, is also extensively reduced as compared with untreated rosin.

With regard to the iodine numbers of the sulfur-treated products of Examples 1 and 1a (138 and 49, respectively) it is noted that the relatively high iodine number of Example 1 is apparently due to the fact that only one stage of heating, and this at a low temperature (140° C.), was employed for sulfurization of Example 1, whereas a second stage of heating was employed for Example 1a, at a considerably higher temperature (220° C.). Nevertheless, the iodine number for the decarboxylated product of Example 1 was also greatly reduced, as a result of the higher temperature employed for decarboxylation, which higher temperature would normally result in evolution of hydrogen sulfide and thus decrease of unsaturation. The iodine numbers of the decarboxylated products of Examples 1 and 1a (48 and 54, respectively) are quite striking when bearing in mind that only 3.75% sulfur was here used.

The distillates of the sulfur treated and decarboxylated products of various of the examples above were subjected to an accelerated oxidation test. The oxidation test was effected by dissolving the product in a suitable solvent and adding an oxidation catalyst, such as a soluble cobalt salt. The material was then placed in a shaker under an initial pressure of 50 lbs. of oxygen, and shaken for an extended period of time. After this the material was removed from the shaker and weighed to determine whether there was any weight gain. From the pressure drop, if any, the weight of oxygen absorbed could be calculated. This calculation was checked against the result of the weight gain measurement, and in most instances the results were found to agree very closely. In the case of the products of the examples above described, the test was considerably extended, in order to make sure that oxygen absorption was not being retarded by an extended induction or lag period.

The distillates of the products of Examples 1 and 1a above were run in the test for 72 hours and showed no oxygen absorption. The distillates of the products of Examples 2 and 3 were run for 96 hours and showed no oxygen absorption. In comparison with the above, it may be noted that the same test applied to the distillate of the decarboxylated WW wood rosin referred to above (at the bottom of Table III) as a comparative blank experiment, resulted in absorption of 14.4% of oxygen in 22 hours. With the product of this blank experiment oxygen absorption commenced after a very short (2 hours) induction or lag period.

I claim:

1. A process for deriving rosin hydrocarbons from acidic rosin materials, which process comprises heating the acidic rosin material in the presence of from about 0.5% to about 20% of sulfur at a temperature between about 100° C. and about 250° C., and thereafter decarboxylating the sulfur-treated material by application of heat at a decarboxylation temperature above about 250° C., the heating being continued at said decarboxylation temperature until the sulfur-treated material is extensively decarboxylated.

2. A process in accordance with claim 1 in which decarboxylation is effected at a temperature between about 250° C. and about 350° C.

3. A process in accordance with claim 1 in which the decarboxylation is effected in the presence of a decarboxylation promoting agent.

4. A process in accordance with claim 1 in which the percentage of sulfur used is from about 2% to about 10%.

5. A process in accordance with claim 1 in which the sulfur treated and decarboxylated material is subsequently distilled.

6. A process for deriving rosin hydrocarbons from acidic rosin materials, which comprises heating rosin with from about 0.5% to about 20% of sulfur at a temperature between about 100° C. and 250° C., and distilling the sulfur-treated material at a temperature above about 250° C. under conditions providing for appreciable decarboxylation of the molecule concurrently with distillation.

7. A process in accordance with claim 6 in which fractional distillation is employed to provide for separation of constituents of different unsaturation characteristics.

8. A process in accordance with claim 6 in which fractional distillation is employed to provide for separation of constituents having different acid values.

NICHOLAS L. KALMAN.